R. H. HAZELTINE.
MACHINE FOR RESEATING VALVES.
APPLICATION FILED FEB. 7, 1912.
Reissued May 21, 1912. 13,421.
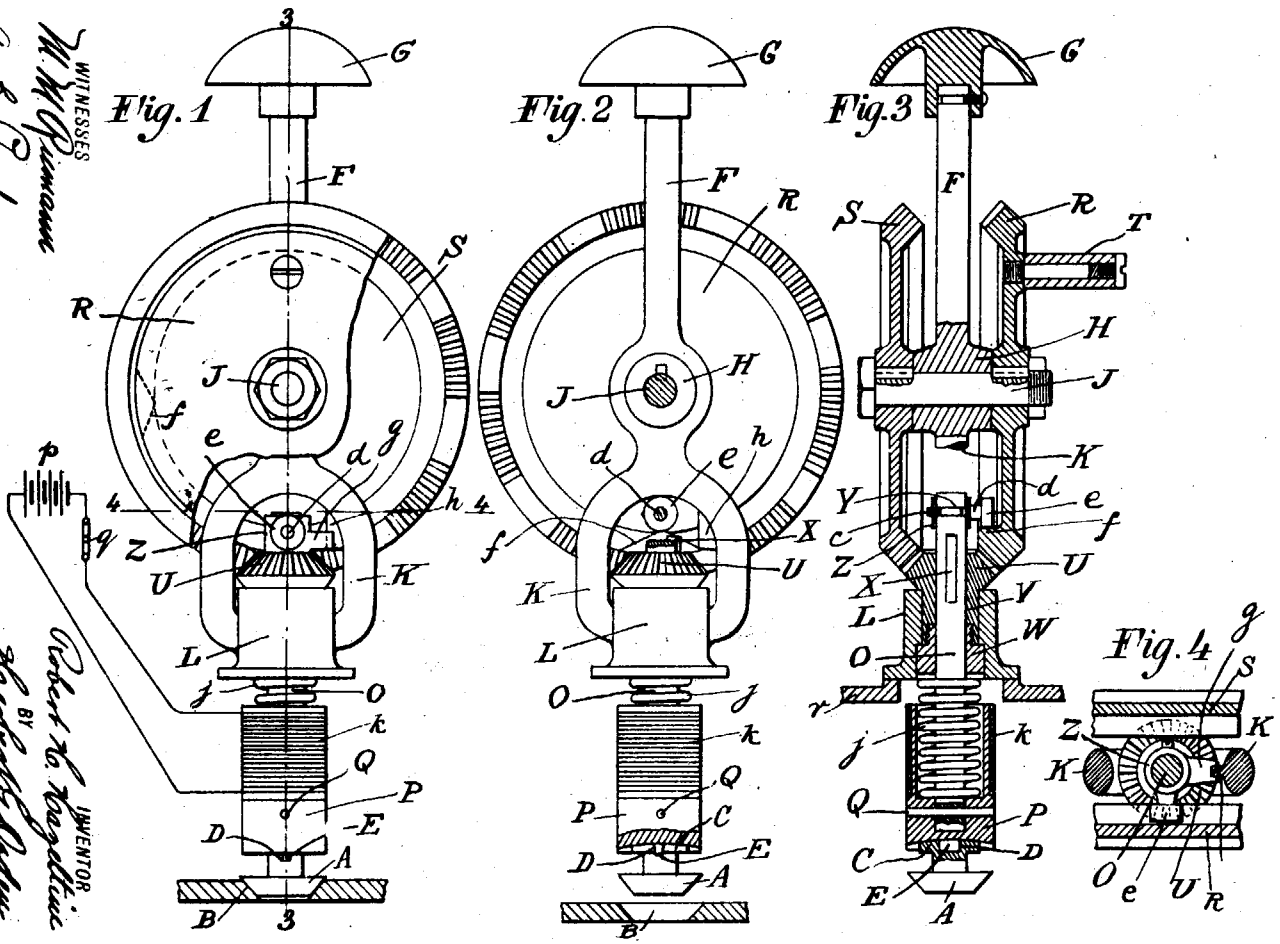
WITNESSES
M. M. Riemann
A. C. Parham
INVENTOR
Robert H. Hazeltine
BY
Herbert E. Ogden
his ATTORNEY

UNITED STATES PATENT OFFICE.

ROBERT H. HAZELTINE, OF NEW YORK, N. Y.

MACHINE FOR RESEATING VALVES.

13,421. Specification of Reissued Letters Patent. Reissued May 21, 1912.

Original No. 918,049, dated April 13, 1909, Serial No. 364,639. Application for reissue filed February 7, 1912. Serial No. 6[illegible],161.

*To all whom it may concern:*

Be it known that I, ROBERT H. HAZELTINE, a citizen of the United States, and a resident of the borough of Manhattan, city, county, and State of New York, have invented certain new and useful Improvements in Machines for Reseating Valves, of which the following is a specification, accompanied by drawings.

This invention relates to machines for reseating valves and the primary object of the invention is to enable a valve to be evenly ground and accurately seated, by positively and continuously acting devices which rotate the valve in opposite directions on its seat and positively and progressively advance the valve periodically in one direction on its seat during rotation. Ridges and unevenness in the grinding are thus prevented, the action is positive, definite and uniform, the progressive advancement of the valve is positive and automatic, and time is saved, since the rotation is not retarded or arrested at any stage, except for the instantaneous pause at the time of reversal.

Further objects of the invention will hereinafter appear and the invention consists of the machine described and claimed in this specification and shown in the accompanying drawings, in one embodiment, in which—

Figure 1 is a side elevation of one side of a device embodying the invention, partly broken away; Fig. 2 is an elevation of the other side of the device partly in section with one gear removed; Fig. 3 is a vertical sectional view on the line 3—3 of Fig. 1, and Fig. 4 is a horizontal sectional view on the line 4—4 of Fig. 1.

Referring to the drawings, A represents a suitable valve adapted to be ground to its seat B. In this instance, by way of illustration, the valve A is shown of a type provided with a convex head C having a transverse slot D for the reception of the tip E of the reseating tool. The frame F of the machine may be of any suitable construction, affording means for mounting the operative parts of the device, in this instance said frame being provided with a hand piece G, the central boss H forming the main bearing for the transverse rotary driving shaft J, and the yoke K carrying the auxiliary bearing L for the longitudinal reciprocating driven shaft O, to which shaft the valve holder P is suitably connected as by means of the pin Q. The tip E as shown is connected to the valve holder P.

Continuously acting positive means are provided for imparting a reciprocating rotary motion to the valve, including positive means for advancing the valve periodically through a greater arc in one direction than in the other direction during rotation, thereby positively advancing the valve progressively on its seat, thus continually bringing new grinding surfaces opposite each other, and preventing uneven grinding. The operation of the tool is continuous and positive and the progressive advance of the valve occurs during rotation without predetermined pause or retardation, so that ridges on the ground surfaces are prevented.

I have illustrated one suitable form of positive mechanism for carrying out the invention, in which R and S are mutilated bevel gears mounted face to face on the main shaft J, and one gear R is provided with an operating handle T for rotating the gears. The gears are mounted in such angular relation that the toothed portions of one gear are opposite the blank portions of the other gear, and a bevel pinion U rotatable with shaft O meshes with both gears R and S. In the example of the invention shown, a given number of successive toothed segments of the gears have the same number of teeth and subtend arcs equal in length to the arcs subtended by the blank portions of the gears falling opposite said toothed segments, so that the pinion U is rotated through equal arcs in opposite directions by said toothed segments. In order to periodically advance the valve on its seat, one or more consecutive toothed segments on each gear are of greater or less arc than the remaining segments, and are provided as shown with a progressively increasing or decreasing number of teeth, opposite corresponding blank spaces on the other gear, so that the pinion U is rotated through unequal arcs during succeeding reversals. The valve A, secured to the valve holder P, which rotates with the shaft O, is thus periodically advanced on its seat B in one direction, whether such advance occurs after intervals of reciprocation through substantially equal arcs, or whether it occurs during succeeding reversals, depending upon how many consecutive segments have a progressively increasing or decreasing number of teeth.

The hub V of the pinion U is mounted in the bearing L and preferably threaded to the bearing block W. The shaft O is keyed to the pinion U by the key X, so that the shaft may slide longitudinally through the pinion, and means are provided for moving the shaft longitudinally at intervals, to move the valve away from its seat, and replace it upon its seat, for better distributing the particles of grinding material, and establish a perfect fit.

The shaft O is provided with a circumferential groove Y at its inner end and a sleeve Z loosely encircles the shaft around the groove. A guide pin *c* passes through the sleeve and engages in the groove Y so that the shaft may rotate within the sleeve, but is moved longitudinally with the sleeve. The sleeve is provided with a stud *d* carrying a roller *e* adapted to ride over the cam *f* provided on the inner periphery of the gear R, and an arm *g* projects from the sleeve Z and is provided with a grooved end engaging a rib *h* on the yoke K, so that the sleeve is held from rotation.

The valve holder P is preferably hollow for a portion of its length as shown, and a compression spring *j* is confined between the outer end of the valve holder and the bearing block W, normally tending to restore the valve to its seat after the valve is removed from its seat by reason of the cam *f* engaging the roller *e*.

In order to more securely hold the valve to its holder, a magnet coil *k* encircles the valve holder P and is connected in circuit with a source of supply, as the battery *p*, including in its circuit a switch *q*.

The operation of the device is as follows: The valve A is secured to the valve holder P as described, and the bearing L is supported on the frame *r*, which may be the frame of the engine or other support. The spring *j* normally maintains the valve in contact with its seat B. The hand piece G is grasped to steady the tool, and the gears R and S are rotated by means of the handle or arm T. The toothed segments on the respective gears R and S alternately engage the pinion U and rotate it first in one direction and then the other, thereby reciprocating the shaft O, valve holder P, and valve A. In the construction shown the cam *f* engages the roller *e* once in every revolution of the gears and moves the shaft O longitudinally to move the valve away from its seat, and the spring returns the valve to its seat. The valve is periodically rotated farther in one direction than the other through one or more reversals, depending upon the number of segments provided on the gears having a progressively increasing or decreasing number of teeth.

I claim and desire to obtain by Letters Patent the following:

1. A valve reseating device comprising a rotary electromagnetic valve holder, and mechanism for rotating the valve holder in reverse directions by the continued movement of said driving mechanism in the same direction, and means brought into action by the driving mechanism for intermittingly elevating the valve holder.

2. A valve reseating device comprising a rotary electromagnetic valve holder, and driving means therefor including a pair of mutilated gears acting alternately to rotate the holder in reverse directions by continued movement of the gears in the same direction, and means brought into action by the rotation of one of the gears for intermittingly elevating the valve holder.

3. A machine for reseating valves comprising a rotary electromagnetic valve holder and driving means therefor including mechanism for rotating the valve through unequal arcs in reverse directions.

4. A hand operated reseating mechanism comprising a frame having a hand piece at one end, and a valve holding device rotatably mounted in its opposite end, a shaft journaled in the frame between the hand piece and rotary valve holder, a pinion mounted in the frame between the valve holder and shaft for rotating the valve holder, a gear mounted on the shaft and meshing with said pinion and provided with a hand piece whereby it may be rotated, and means actuated by the gear for elevating the valve holder once in each revolution of said gear.

5. A hand operated reseating mechanism comprising a frame having a hand piece at one end, and a valve holding device rotatably mounted in its opposite end, a shaft journaled in the frame between the hand piece and rotary valve holder, a pinion mounted in the frame between the valve holder and shaft for rotating the valve holder, a gear mounted on the shaft and meshing with said pinion and provided with a hand piece whereby it may be rotated, means actuated by the gear for elevating the valve holder once in each revolution of said gear, and a spring for depressing the valve holder after each elevation by said means.

6. In a hand operated valve reseating device, the combination of a frame having a hand piece at one end, an axially movable rotatable shaft journaled in the opposite end of the frame, a tool holder secured to said shaft and movable axially therewith, a pinion journaled in said opposite end of the frame and feathered upon said shaft to permit the shaft to move axially therethrough, a driving shaft journaled in the frame between the pinion and hand piece, a gear secured to the shaft and meshing with said pinion to rotate the latter and also the first named shaft, means actuated by the gear for moving the shaft endwise in one direction at each revolution of the gear, and a spring for moving said first named shaft in the opposite direction when released by said means.

7. A hand operated valve reseating device comprising a frame having a hand piece at one end, a rotary tool holder journaled in the opposite end of the frame, a pinion for rotating said tool holder, a shaft journaled in the frame between the pinion and hand piece, and a pair of mutilated gears secured to said shaft and alternately engaging opposite sides of the pinion, one of said gears being provided with a hand piece by which the shaft and both gears may be rotated, means actuated by one of the gears for moving the tool holder axially in one direction, and a spring for moving the tool holder in the opposite direction when released by said means.

8. In a machine for reseating valves, comprising continuously acting positive means for reciprocating the valve, including positive means for rotating the valve periodically through a greater arc in one direction than in the other direction during rotation, thereby positively advancing the valve progressively on its seat.

9. A machine for reseating valves, comprising continuously acting positive means for imparting a reciprocating rotary motion to the valve, including positive means for advancing the valve periodically through a greater arc in one direction than in the opposite direction during reciprocation, thereby positively rotating the valve progressively on its seat.

10. A machine for reseating valves, comprising continuously acting positive means for alternately rotating the valve in opposite directions on its seat, including positive means for advancing the valve periodically in one direction during rotation, thereby positively changing the position of the valve progressively relatively to its seat.

In testimony whereof I have signed this specification in the presence of two subscribing witnesses.

ROBERT H. HAZELTINE.

Witnesses:

HERBERT G. OGDEN,
HENRY SHELDON.